United States Patent [19]

Yamagishi

[11] Patent Number: 4,985,791
[45] Date of Patent: Jan. 15, 1991

[54] CASSETTE LOADING DEVICE
[75] Inventor: Hiromasa Yamagishi, Yao, Japan
[73] Assignee: Sanyo Electric Co., Ltd., Osaka, Japan
[21] Appl. No.: 327,492
[22] Filed: Mar. 24, 1989
[30] Foreign Application Priority Data Mar. 28, 1988 [JP] Japan .................................. 63-74016
Jun. 17, 1988 [JP] Japan ................................. 63-150576

[51] Int. Cl.⁵ .......................................... G11B 5/008
[52] U.S. Cl. ..................................... 360/96.5; 242/199
[58] Field of Search ................. 360/96.5; 242/197–201

[56] References Cited
U.S. PATENT DOCUMENTS
4,628,382 12/1986 Okumura .
4,772,970 9/1988 Sato ..................................... 360/96.5

FOREIGN PATENT DOCUMENTS
60-133757 6/1985 Japan .

*Primary Examiner*—A. J. Heinz
*Attorney, Agent, or Firm*—Armstrong, Nikaido, Marmelstein, Kubovcik & Murray

[57] ABSTRACT

A cassette loading device for transporting a tape cassette inserted into a cassette inlet to a recording-reproducing position comprises a system for transmitting power from a loading motor to a cassette holder, and a holder lock mechanism incorporated in the system for locking the cassette holder in a loading completed position. The holder lock mechanism comprises a first rotary member drivingly rotatable by the power of the motor, a second rotary member for transmitting the power to the cassette holder, and a coupling member engageable with the two rotary members at the same time for connecting the members together. When the cassette is completely loaded, the coupling member is self-locked to thereby prevent the second rotary member from rotating in an unloading direction.

6 Claims, 17 Drawing Sheets

CASSETTE LOADING DEVICE

FIELD OF THE INVENTION

The present invention relates to magnetic recording-reproduction apparatus, such as VTRs, for recording signals on the tape in a cassette or reproducing signals from the tape, and more particularly to a cassette loading device for use in such an apparatus for transporting the cassette from a cassette inlet to a recording-reproduction position.

BACKGROUND OF THE INVENTION

When a tape cassette is inserted into the VTR of the so-called front loading type through a cassette inlet formed in the front panel of the apparatus, the cassette is transported by a cassette loading device first horizontally and then downward and is finally placed on a pair of reel supports arranged inside the apparatus.

Although a drive motor specific to the cassette loading device is usually used as the power source for the device, a VTR has been proposed wherein the power source for a tape loading mechanism for withdrawing the magnetic tape from the cassette and winding the tape around a rotary head cylinder is used also as the power source for the cassette loading device so as to make the recorder compact, lightweight and less expensive to make (Unexamined Japanese Patent Publication SHO No. 61-289572).

FIG. 19 shows the cassette loading device of the proposed VTR. A cassette holder 2 is movable by being guided along an L-shaped guide slit 102 formed in each side plate 101 on a chassis 1. A loading motor 5 is coupled to a gear lever 107 through a pulley mechanism 103, clutch 104, worm 105, and a train of gears including a worm wheel 106. The gear lever 107 includes a gear portion 110 meshing with the gear train and a lever portion 108 in engagement with the cassette holder 2 and supported by the same shaft as the gear portion 110. A torsion spring 111 is provided between the gear portion 110 and the lever portion 108.

The clutch 104 is engaged or disengaged by the rotation of a cam plate 109 which is coupled to the clutch 104 by a lever mechanism 112.

The tape loading mechanism (not shown), which is already known, is coupled to the pulley mechanism 103.

When a tape cassette 11 is to be loaded, the clutch 104 is engaged, through which the rotation of the loading motor 5 is transmitted to the gear lever 107 to thereby transport the cassette 11 with the cassette holder 2 inwardly of the recorder along the guide slit 102.

After the cassette holder 2 reaches the terminal end of the path of its travel along the guide slit 102, the worm 105 is slightly driven, thereby elastically deforming the torsion spring 111. The repellent force of the spring depresses the holder 2 at the terminal end of the path, whereby the cassette 11 is completely loaded.

Although the repellent force of the torsion spring 111 acts as a torque to reversely rotate the worm wheel 106 in this state, the torque is withstood by the frictional resistance between the meshing teeth of the worm 105 and the worm wheel 106, with the result that the cassette holder 2 is locked at the terminal end of the path of travel of the holder 2.

On completion of cassette loading, the clutch 104 is disengaged. The magnetic tape is thereafter loaded in place by the operation of the loading motor 5.

However, the VTR is very complex in construction and large-sized owing to the provision of the pulley mechanism 103, clutch 104, lever mechanism 112, cam plate 109, etc. and therefore has the problem that this disadvantage offsets the advantage of using a single motor for both the cassette loading device and the tape loading mechanism.

Furthermore, the clutch 104 is disengaged while the cassette is in its completely loaded position, so that when the device is subjected to an external impact, the worm wheel 106 is likely to disengage from the worm 105 against the frictional resistance and rotate to unlock the cassette holder 2.

SUMMARY OF THE INVENTION

An object of the present invention is to provide a cassette loading device which is adapted to lock the cassette holder at the terminal end of the path of its travel more reliably than in the prior art while the cassette is in its completely loaded position so as to prevent unlocking of the holder even when the device is subjected to an impact or the like.

Another object of the invention is to provide a cassette loading device for use in a recording-reproduction apparatus wherein a common motor is used for loading a cassette in place and also for other operation, for example, for tape loading, the cassette loading device comprising a power transmission system for transmitting power from the motor to a cassette holder, and an intermittent rotation mechanism having a simple construction and incorporated in the transmission system in place of the complex clutch mechanism heretofore used for transmitting the power of the motor to the cassette holder during cassette loading, the cassette holder being reliably lockable in the loading completed position while the intermittent rotation mechanism is out of power transmitting operation.

The cassette loading device of the present invention comprises a power transmission system for transmitting power from a motor on a chassis to a cassette holder, and a holder lock mechanism incorporated in the transmission system for locking the cassette holder in a loading completed position.

The holder lock mechanism comprises a first rotary member drivingly rotatable by the power of the motor, a second rotary member for transmitting the power to the cassette holder, a coupling member engageable with the two rotary members at the same time to couple the two rotary members together, and restricting means engageable with the coupling member for restricting the movement of the coupling member. The restricting means comprises a first restricting portion for restricting the movement of the coupling member from the start of cassette loading until the cassette is almost completely loaded to cause the coupling member to couple the two rotary members together and make the members rotatable together, and a second restricting portion for restricting the position of the coupling member on completion of cassette loading to cause the coupling member to prevent the second rotary member from rotating in an unloading direction.

Accordingly, even if the portion of the power transmission system from the second rotary member through the cassette holder is subjected to a force acting in the cassette unloading direction when the cassette is completely loaded, there is no likelihood that the cassette holder will be unlocked since the second rotary member is prevented from rotation.

Further in the case where the single motor is used for loading the cassette and for other operation, for example, for loading the tape, the power transmission system has incorporated therein an intermittent rotation mechanism disposed between the motor and the holder lock mechanism and adapted to effect power transmission during cassette loading but to interrupt power transmission after the completion of cassette loading.

In this case, the cassette holder is uncoupled from the motor by the intermittent rotation mechanism after the cassette has been completely loaded, but the cassette holder is reliably locked in the loading completed position by the operation of the holder lock mechanism.

DETAILED DESCRIPTION OF EMBODIMENT

With reference to the drawings, a cassette loading device of the invention will be described below as it is adapted for use in VTRs.

OVERALL CONSTRUCTION

Figure 1:
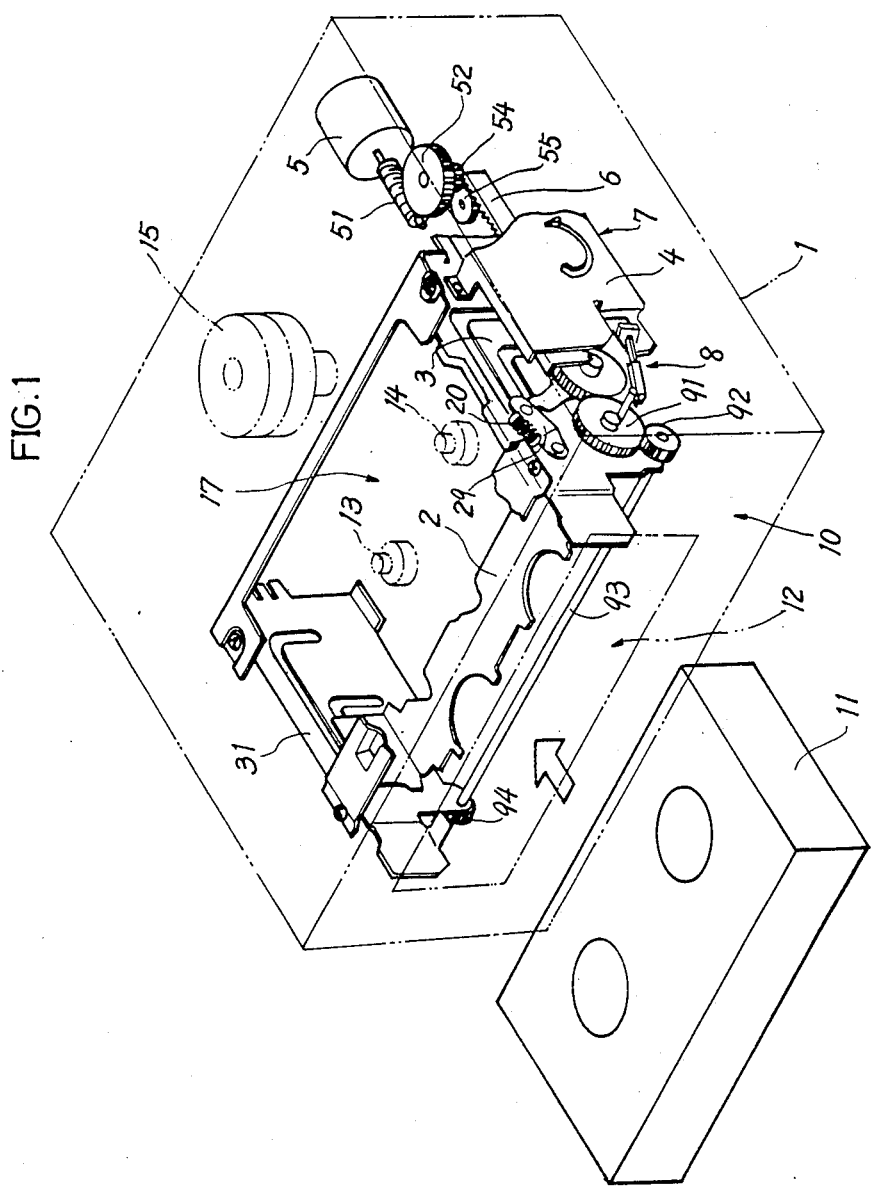
FIG. 1 is a perspective view partly broken away and schematically showing a VTR having a cassette loading device of the present invention.

With reference to FIG. 1, the VTR has a front panel 10 formed with an inlet 12 for a tape cassette 11. Arranged on a chassis 1 inwardly of the inlet 12 are a supply reel support 13 and a take-up reel support 14 for drivingly rotating two reels within the cassette 11, and a rotary head cylinder 15 for winding a magnetic tape therearound.

The cassette loading device comprises a pair of opposed support plates 3, 31 spaced apart at a specified distance and extending upright from the chassis 1, a cassette holder 2 supported by the pair of support plates 3, 31, the path 17 of travel of the holder 2 extending from a cassette insertion waiting position opposed to the inlet 12 to a loading completed position above the pair of reel supports 13, 14, and a power transmission system for transmitting the power of a loading motor 5 on the chassis 1 to the cassette holder 2 to reciprocatingly move the cassette holder along the path 17.

The cassette loading device, when operated, transports the cassette 11 on the holder 2 first horizontally inwardly of the recorder and then downward and finally sets the cassette 11 on the supply reel support 13 and the take-up reel support 14.

CASSETTE HOLDER AND GUID MECHANISM THEREFOR

Although not shown or described, the chassis 1 has mounted thereon various known mechanisms such as a reel support drive mechanism for drivingly rotating the pair of reel supports 13, 14, and a tape loading mechanism for withdrawing the magnetic tape from the cassette 11 on the reel supports and winding the tape around the rotary head cylinder 15. The tape loading mechanism is driven by the loading motor 5 as will be described later.

Figure 5:
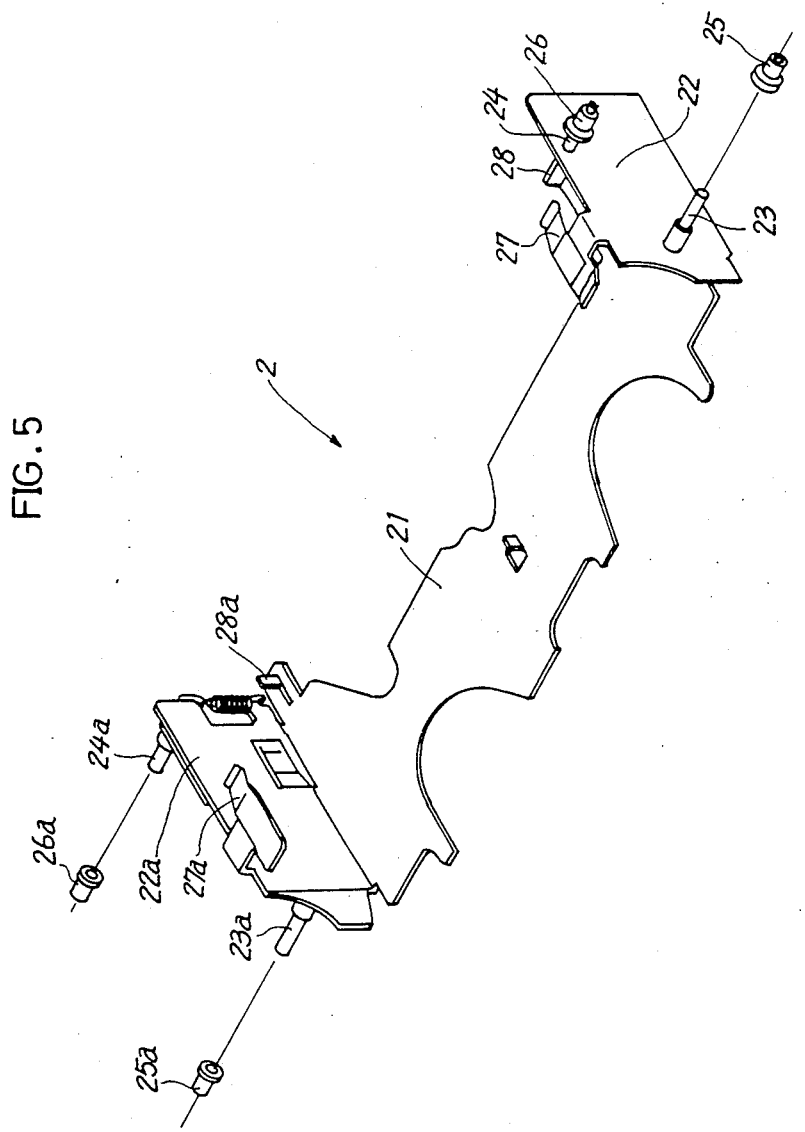
FIG. 5 is an exploded perspective view of the cassette holder.

With reference to FIG. 5, the cassette holder 2 comprises a bottom plate 21 having approximately the same width as the cassette 11, and a pair of side plates 22, 22a extending upward from the opposite sides of the bottom plate 21. The bottom plate 21 has at its inner portion stoppers 28, 28a for stopping the cassette. The side plates 22, 22a are provided at their upper ends with resilient holding plates 27, 27a, respectively, for pressing the upper side of the cassette downward. Projecting outward from the side plates 22, 22a are a pair of shafts 23, 24 and a pair of shafts 23a, 24a, respectively, carrying resin rollers 25, 26, 25a, 26a, respectively.

Figure 2:
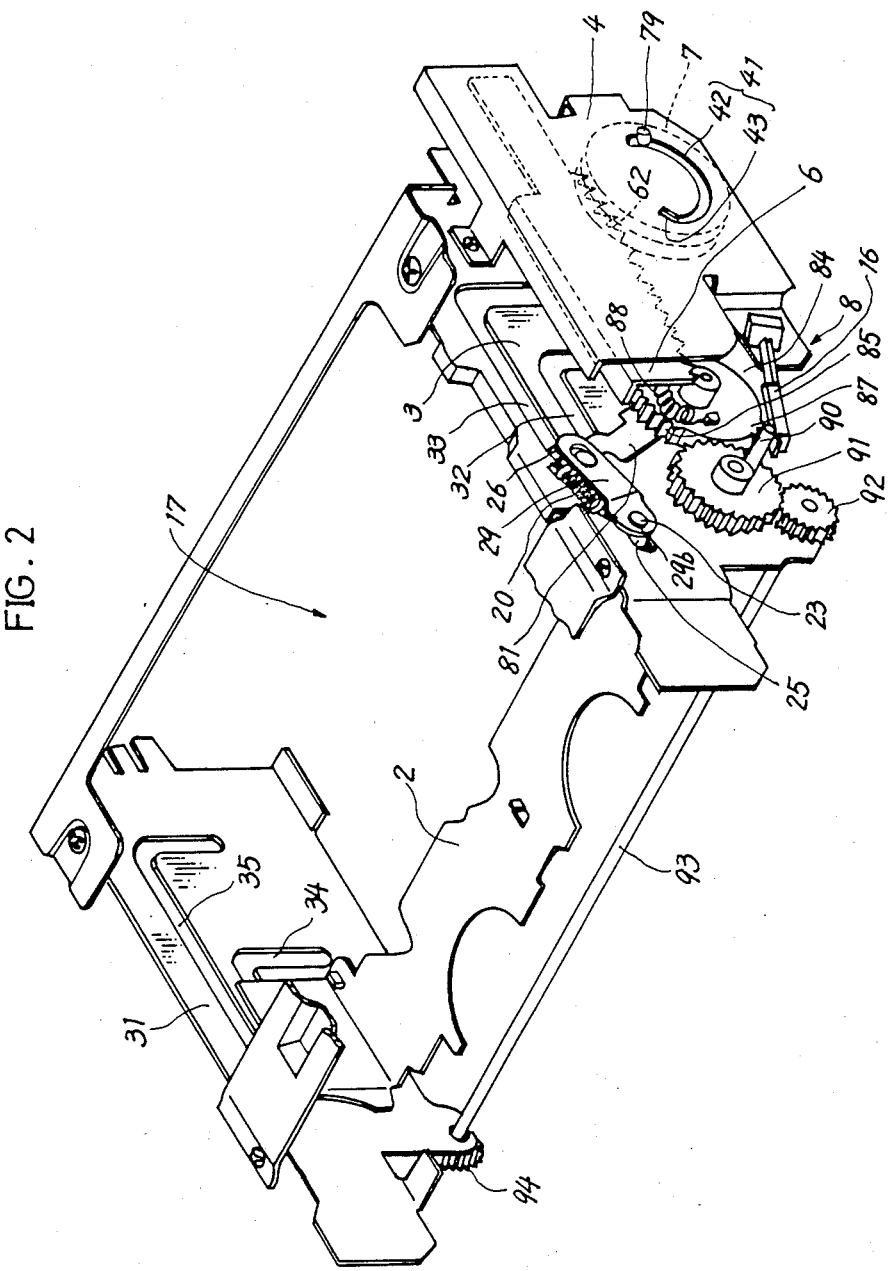
FIG. 2 is a perspective view partly broken away and showing the cassette loading device as it is seen obliquely from the right side.
Figure 3:
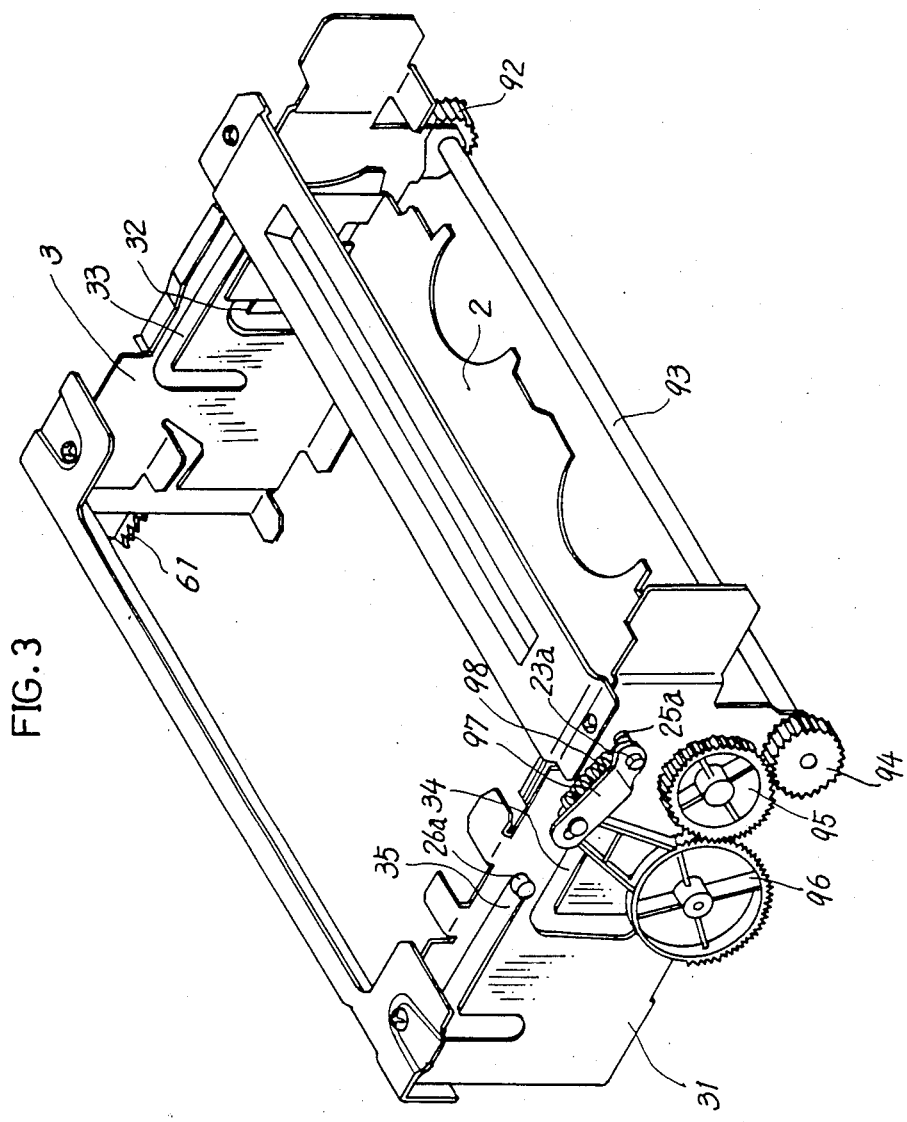
FIG. 3 is a perspective view of the device as it is seen obliquely from the right side; p

With reference to FIGS. 2 and 3, the right and left support plates 3, 31 are respectively formed with a pair of L-shaped slide guide slits 32, 33 and a pair of like slits 34, 35 having slidably fitted therein the respective rollers 25, 26, 25a, 26a, whereby the holder 2 is guided when moving horizontally and vertically.

GENERAL CONSTRUCTION OF POWER TRANSMISSION SYSTEM

Figure 4:
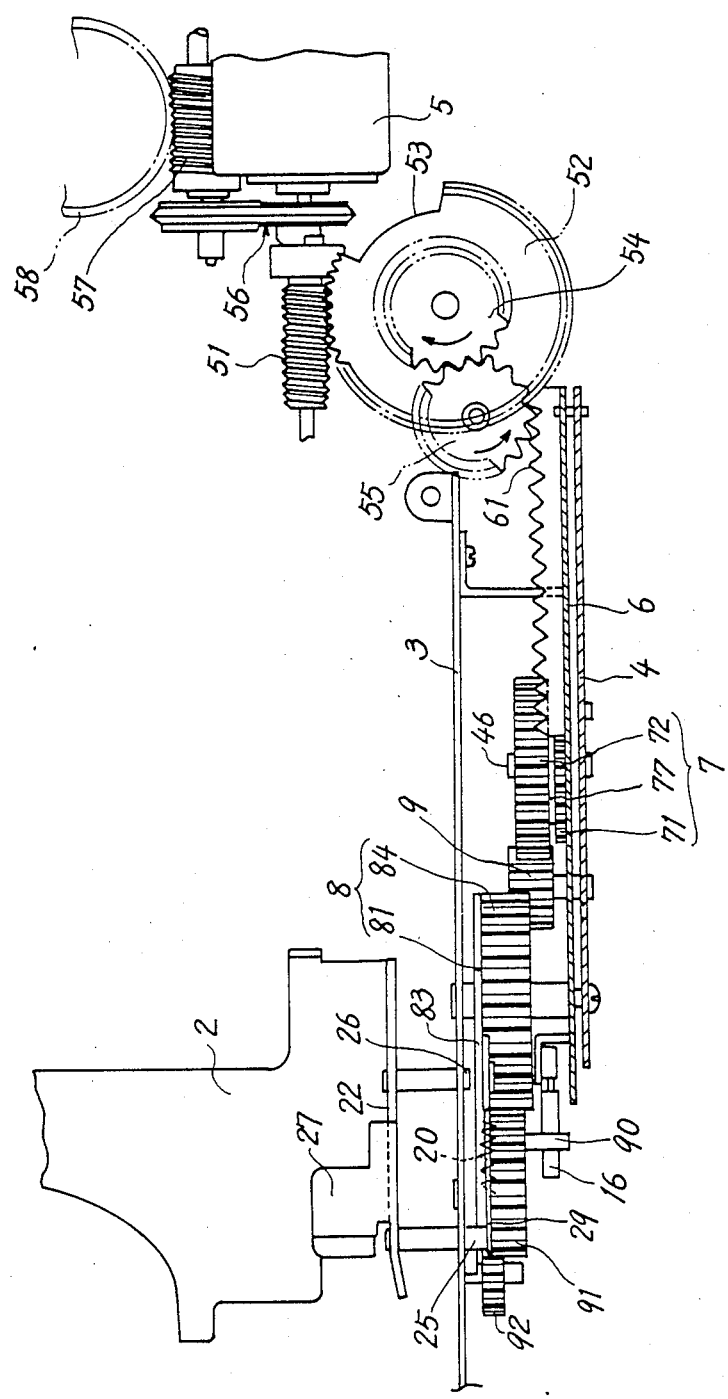
FIG. 4 is a plan view showing a system for transmitting power from a loading motor to a cassette holder.

The system for transmitting power from the loading motor 5 mounted on the chassis 1 to the cassette holder 2 consists primarily of a gear mechanism as seen in FIGS. 1 and 4.

The motor 5 has an output shaft fixedly carrying a worm 51 which is in mesh with a worm wheel 52 supported on the chassis 1. The worm wheel 52 is integral with a small gear 54 in mesh with a pinion 55 on the chassis 1. The pinion 55 is coupled to the cassette holder 2 via a slide drive plate 6, drive rotary member 7, intermediate gear 9, driven rotary member 8, etc. as will be described later.

The output shaft of the loading motor 5 is also coupled to the unillustrated tape loading mechanism via a pulley mechanism 56, intermediate worm 57 and intermediate worm wheel 58. After the completion of cassette loading, the tape is loaded by the operation of the motor 5 as will be described later.

The worm wheel 52 is formed over a predetermined region with a toothless portion 53, which is opposed to the worm 51 after the completion of cassette loading to interrupt the transmission of power from the loading motor 5 to the cassette holder 2.

The construction of the power transmission system will be described below in greater detail.

SLIDE DRIVE PLATE AND GUIDE MECHANISM THEREFOR

With reference to FIG. 2, the right support plate 3 is provided outside thereof with a subsupport plate 4 secured to the plate 3 and spaced apart therefrom by a specified distance. A slide drive plate 6 disposed inside the subsupport plate 4 is reciprocatingly movable horizontally.

Figure 8:
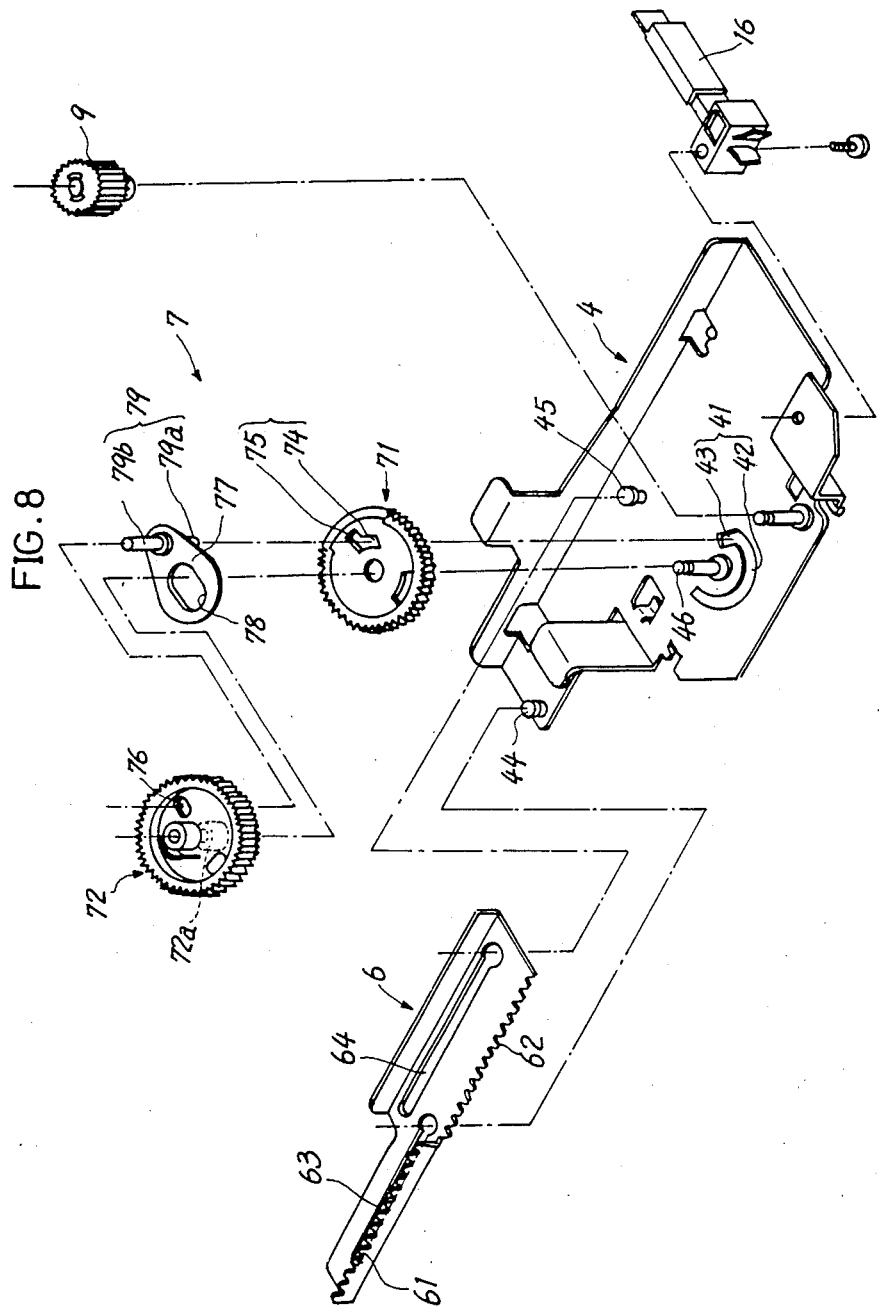
FIG. 8 is an exploded perspective view showing a slide drive plate, a drive rotary member and the intermediate gear.

As seen in FIG. 8, the subsupport plate 4 has a pair of pins 44, 45 projecting from its inner surface. On the other hand, the slide drive plate 6 has a pair of slits 63, 64 extending longitudinally thereof. The pins 44, 45 are slidably fitted in the slits 63, 64, respectively, for guiding the reciprocation of the slide drive plate 6.

The plate 6 has a first rack portion 61 always in mesh with the pinion 55, and a second rack portion 62 directed at 90 degrees with the direction of the rack portion 61 and meshing with a first gear 71 of the drive rotary member 7 at all times.

DRIVE ROTARY MEMBER AND INTERMEDIATE GEAR

The drive rotary member 7 is mounted on the subsupport member 4 as positioned inside of the member 4. The rotary member 7 functions to transmit the rotation of the pinion 55 to the intermediate gear 9 and constitutes a holder lock mechanism for locking the cassette holder 2 when the cassette has been completed loaded as will be described later. As seen in FIG. 8, the drive rotary member 7 comprises the first gear 71, a coupling plate 77 and a second gear 72 which are freely rotatably supported by a shaft 46 projecting inward from the subsupport plate 4.

Figure 15:
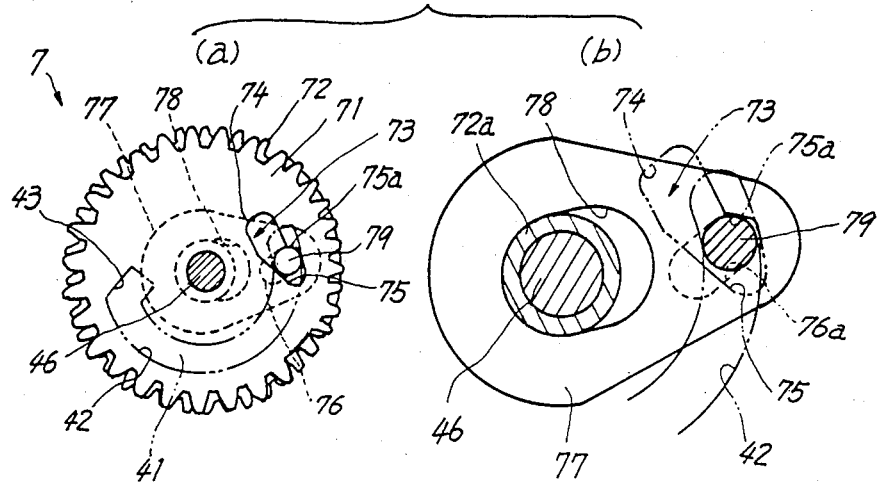
FIGS. 15 (a) and (b) to FIGS. 18 (a) and (b) are side elevations showing the drive rotary member in the sequential operation from the start of loading until completion of loading.

The first gear 71 is formed with a first aperture 73 comprising a circular-arc aperture portion 74 centered about the shaft 46, and a slanting aperture portion 75 extending from one end of the portion 74 toward the gear periphery and slanting at a specified angle with a radial line of the gear 71 (see FIGS. 15 (a) and (b)). The configuration of the first aperture 73 will be described in detail later.

The second gear 72 has a second aperture 76 extending obliquely from its inner periphery toward the outer periphery thereof and inclined at a specified angle with a radial line of the gear (see FIGS. 15 (a) and (b)). The angle of inclination will be described later.

The coupling plate 77 serves to couple the first gear 71 to the second gear 72 to make them rotatable together. The plate 77 has a slot 78 for a boss 72a projecting from the second gear 72 to loosely fit in. An engaging pin 79 positioned on an extension of a center line of the slot 78 extends through the plate 77 and projects from opposite sides thereof. One pin piece 79a projecting from one side is engaged in the first aperture 73 of the first gear 71, and the other pin piece 79b on the other side is engaged in the second aperture 76 of the second gear 72.

The pin piece 79a further extends through the first aperture 73 of the first gear 71 and has its forward end engaged in a guide aperture 41 formed in the subsupport plate 4. The guide aperture 41 has a circumferential aperture portion 42 extending on a circumference centered about the shaft 46, and a lock aperture portion 43 extending from one end of the portion 42 and bent toward the shaft 46.

As shown in FIG. 4, the intermediate gear 9 meshing with the second gear 72 is supported by the subsupport plate 4 on the inner side thereof.

DRIVEN ROTARY MEMBER AND ASSEMBLY FOR COUPLING THE MEMBER TO CASSETTE HOLDER

Figure 6:
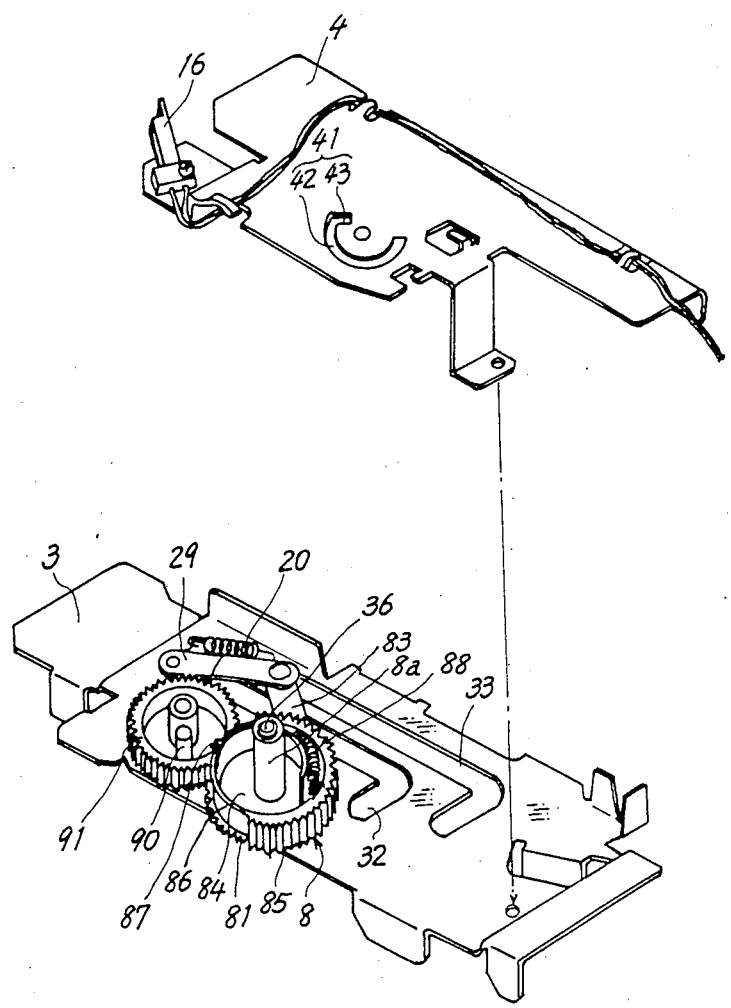
FIG. 6 is a perspective view showing a driven rotary member and an intermediate gear on a right support plate, and a removed subsupport plate.

The driven rotary member 8 is disposed in the space between the right support plate 3 and the sub-support plate 4, meshes with the intermediate gear 9 and is coupled to the cassette holder 2. As seen in FIG. 6, the rotary member 8 is rotatably supported by a shaft 36 projecting from the right support plate 3.

Figure 7:
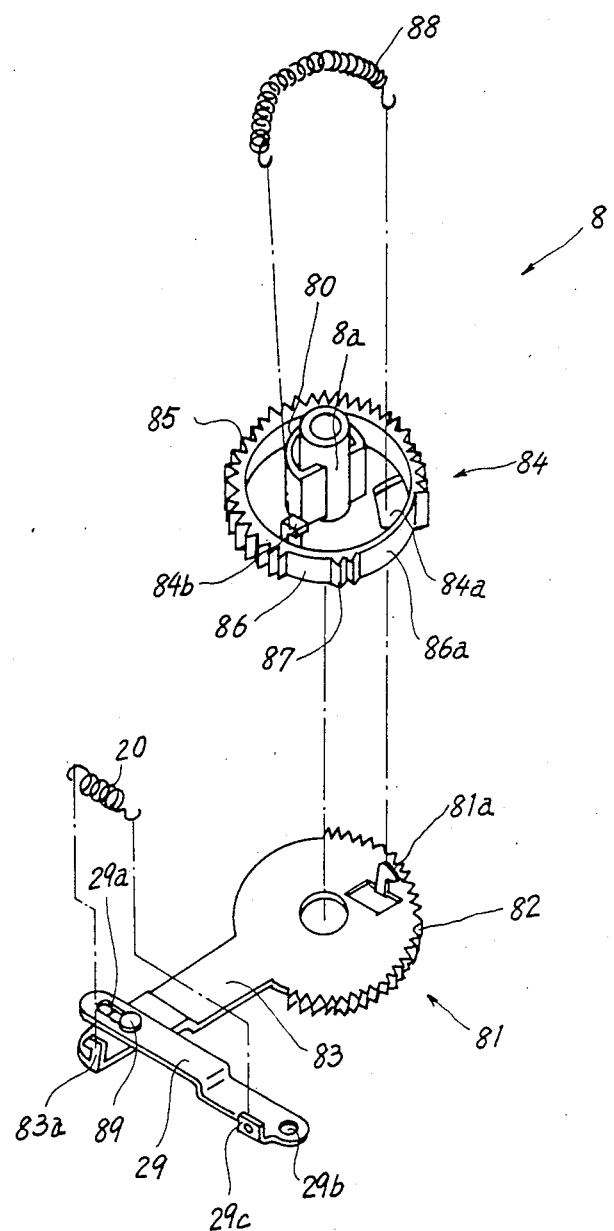
FIG. 7 is an exploded perspective view of the driven rotary member.

With reference to FIG. 7, the driven rotary member 8 comprises a gear lever 81 connected to the cassette holder 2 by a first coiled spring 20 and a link 29, a driven gear 84 directly in mesh with the intermediate gear 9, and a second coiled spring 88 provided between the gear lever 81 and the driven gear 84. The gear lever 81 and the driven gear 84 are freely rotatably fitted to the shaft 36, are in engagement with each other and are rotatable relative to each other over a predetermined angular range.

The gear lever 81 comprises a gear portion 82 in the form of a disc and a lever portion 83 extending therefrom. A hook 81a and a lug 83a are formed at a side portion of the gear portion 82 and the forward end of the lever portion 83, respectively. A retaining pin 89 is provided on the lever portion 83 close to its lug 83a and is slidably fitted in a slit 29a formed in a link 29 longitudinally thereof.

The driven gear 84 has a main gear portion 85, first toothless portion 86, auxiliary gear portion 87 and second toothless portion 86a along its periphery each over a predetermined angular range about its center. The gear 84 has a boss 8a with the shaft 36 fitted therein and a circular-arc projection 80 around the boss. A sectorial window 84a having the gear lever hook 81a loosely inserted therethrough, and a hook 84b are formed in the vicinity of the respective ends of the projection 80.

The second coiled spring 88 extends around the projection 80 and is attached to the hook 81a on the gear lever 81 and to the hook 84b on the driven gear 84.

The link 29 has a shaft hole 29b in its one end remote from the slit 29a, and a lug 29c close to the hole 29b. The first coiled spring 20 extends between and is attached to the lug 29c and to the lug 83a on the gear lever 81.

With reference to FIG. 2, the shaft 23 projecting from the cassette holder 2 is rotatably fitted in the hole 29b of the link 29, whereby the gear lever 81 is coupled to the holder 2 through the link 29 and the first coiled spring 20. Thus, the power of the loading motor 5 is transmitted to the holder 2.

SYSTEM FOR TRANSMITTING POWER TO LEFT SIDE PLATE OF CASSETTE HOLDER

As seen in FIG. 2, the right support plate 3 carries a first transmission gear 91 always in mesh with the gear lever 81 of the driven rotary member 8 and meshable with the gear portion 85 or 87 of the driven gear 84, and a second transmission gear 92 always in mesh with the first transmission gear. The second transmission gear 92 is connected to a third transmission gear 94 on the left support plate 31 by a connecting shaft 93 rotatably supported on the two support plates 3, 31.

With reference to FIG. 3, the left support plate 31 is provided with a fourth transmission gear 95 meshing with the third transmission gear 94 and a gear lever 96 meshing with the gear 95. The gear lever 96 has substantially the same configuration as the gear lever 81 of the driven rotary member 8 and has the forward end of its lever portion connected to the shaft 23a of the cassette holder 2 by a link 97 and a third coiled spring 98. The connecting assembly is the same as the one connecting the right gear lever 81 to the cassette holder 2 and shown in FIGS. 2 and 7.

MECHANISM FOR ACTUATING LOADING MOTOR

With reference to FIG. 2, the first transmission gear 91 has a pin 90 projecting outward therefrom. Mounted on the subsupport plate 4 is a switch 16 which is turned on or off by the movement of the pin 90.

As will be described later, the switch 16 is held closed by the pin 90 before the start of cassette loading, but is opened with the insertion of the tape cassette 11 to detect the time when the cassette loading operation is started. The detection signal is fed to the loading motor 5 as a start instruction signal, in response to which the motor 5 is initiated into operation.

The cassette loading device operates in sequence as will be described below with reference to FIGS. 9 to 18. A detailed description will also be given of the drive rotary member 7, the driven rotary member 8, etc.

START OF CASSETTE LOADING

Figure 9:
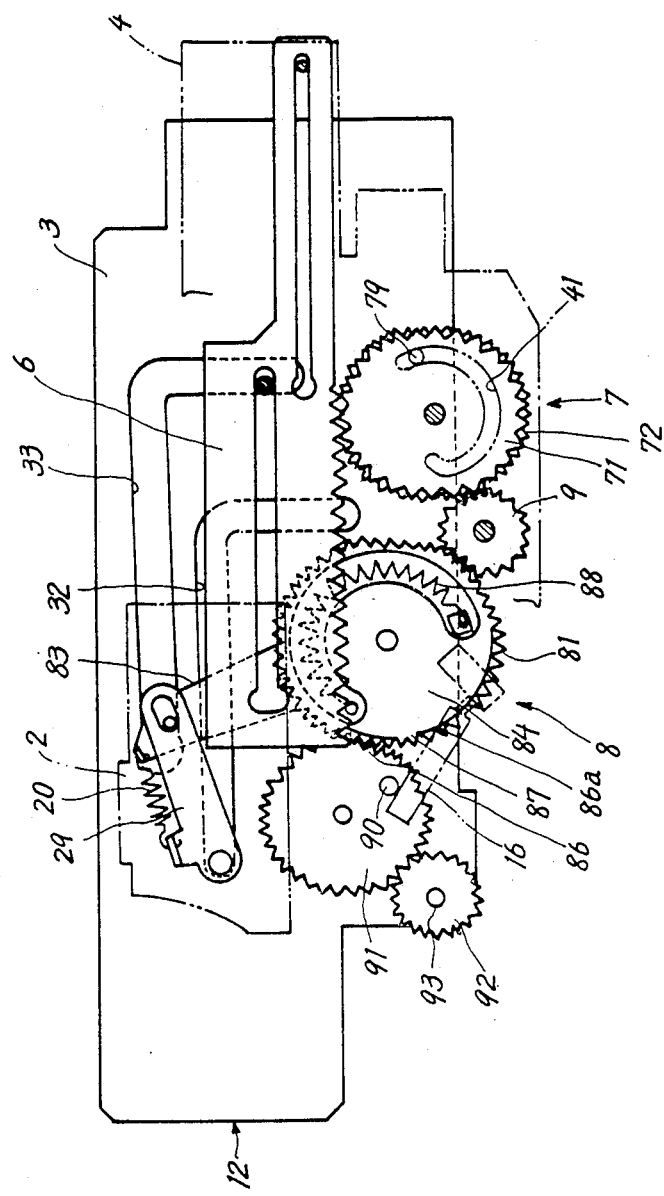
FIG. 9 to FIG. 14 are side elevations showing the cassette loading device in a sequential operation from the start of loading until completion of loading.

When not loaded with a cassette, the holder 2 is waiting at a position most proximate to the cassette inlet 12 as seen in FIG. 9, with the switch 16 held closed by being depressed by the pin 90 on the first transmission gear 91.

The slides drive plate 6 is positioned at the left end of the path of its movement. The first toothless portion 86 of the driven gear 84 of the driven rotary member 8 is opposed to the first transmission gear 91, with the gear lever 81 of the member 8 only in mesh with the first transmission gear 91. Thus, the driven gear 84 is out of meshing engagement with the first transmission gear 91.

The loading motor 5 shown in FIG. 4 is unenergized, and the worm 51 on the motor output shaft is in mesh with the worm wheel 52.

Figure 10:
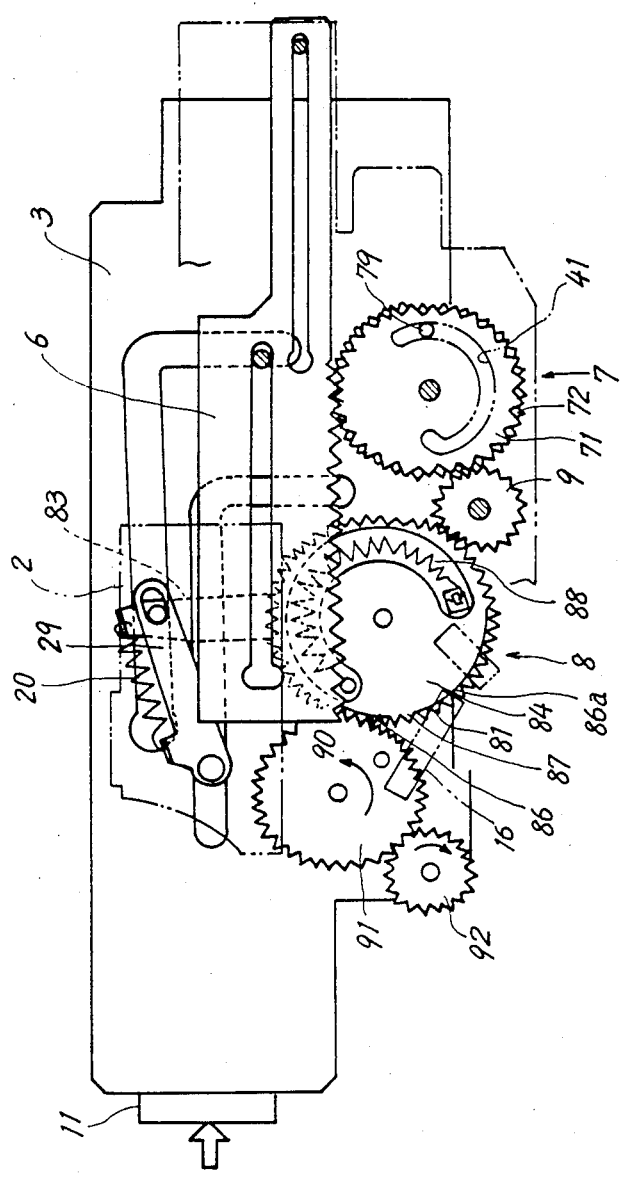

In this state, a tape cassette 11 is inserted into the holder 2 as seen in FIG. 10 and further pushed in. With the retraction of the holder 2, the gear lever 81 of the driven rotary member 8 rotates clockwise. However, as seen in FIG. 4, the driven gear 84 of the driven rotary member 8 is coupled to the worm wheel 52, which in turn is restrained from rotation by meshing with the worm 51 at rest, so that the driven gear 84 is also restrained from rotation.

Consequently, the gear lever 81 only rotates with the movement of the cassette holder 2, with the driven gear 84 remaining at rest. The rotation of the gear lever 81 relative to the driven gear 84 is absorbed by the stretch of the second coiled spring 88.

The clockwise rotation of the gear lever 81 rotates the first transmission gear 91 counterclockwise, further rotating the second transmission gear 92 clockwise.

During this process, the gears on the left side shown in FIG. 3 also move in the same manner as the corresponding gears on the right side.

When the cassette holder 2 moves by a predetermined distance (about 10 mm), the pin 10 on the first transmission shaft 91 moves out of contact with the switch 16 as seen in FIG. 10, thereby opening the switch 16 and starting the loading motor 5 shown in FIG. 4 in response to a signal from the switch 16. Thus, cassette loading is initiated.

CASSETTE LOADING OPERATION

Figure 11:
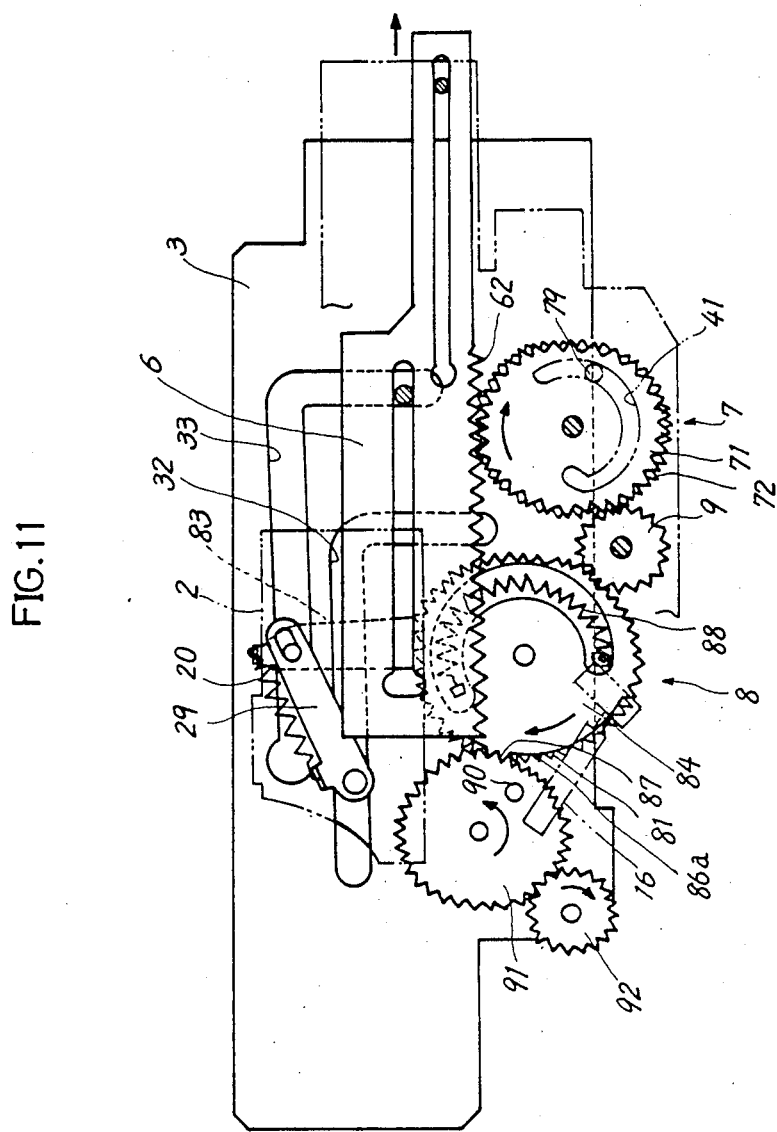

The rotation of the loading motor 5 is transmitted through the worm 51, the worm wheel 52 and the small gear 54 to the pinion 55, which rotates to move the slide drive plate 6 rightward as shown in FIG. 11.

The movement of the drive plate 6 drives the first gear 71 of the drive rotary member 7 meshing with the second rack portion 62 of the drive plate 6.

With reference to FIGS. 15 (a) and (b), the engaging pin 79 of the coupling plate 77 at this time is in engagement with the end wall of the second aperture 76 of the second gear 72 which wall is positioned toward the outer periphery of the gear. The pin 79 also extends through the slanting aperture portion 75 of the first gear 71 and is engaged in the counterclockwise end of the guide aperture 41 of the subsupport plate 4. When the first gear 71 rotates clockwise from this state, one side wall 75a defining the slanting aperture portion 75 pushes the pin 79, moving the pin 79 clockwise along the circumferential aperture portion 42 of the guide aperture 41.

With this movement, the coupling plate 77 rotates clockwise, and the engaging pin 79 pushes the wall 76a defining the second aperture 76 of the second gear 72 thereby driving the second gear 72 clockwise. Consequently, the first gear 71 and the second gear 72 of the drive rotary member 7 rotate together clockwise.

Figure 12:
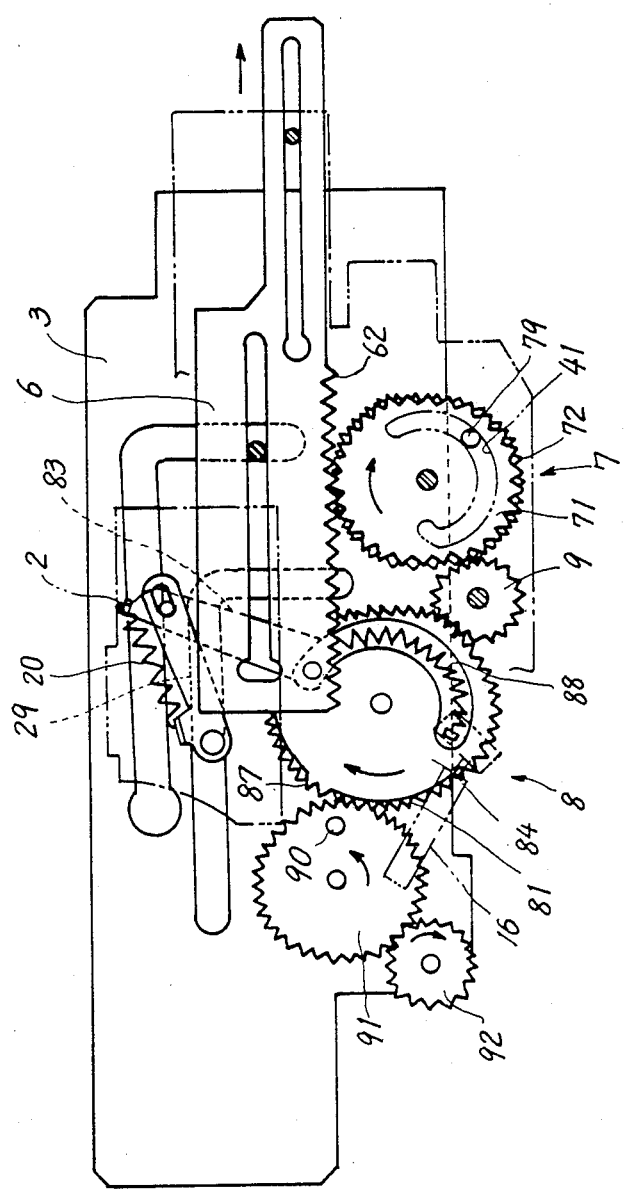

The rotation of the second gear 72 is transmitted to the driven gear 84 of the driven rotary member 8 through the intermediate gear 9 as shown in FIG. 11. With the rotation of the gear 84, the auxiliary gear portion 87 temporarily meshes with the first transmission gear 91. Further rotation of the gear 84 releases the auxiliary gear portion 87 from the first transmission gear 91 as shown in FIG. 12. The movement of the auxiliary gear portion 87 into and out of meshing engagement with the first transmission gear 91 will be described later as to its effect.

During the clockwise rotation of the driven gear 84 from the state of FIG. 11 to that of FIG. 12, the end wall of the window 84a formed in the driven gear 84 as seen in FIG. 7 comes into contact with the hook 81a on the gear lever 81. The driven gear 84, when further rotated, causes the window end wall to push the hook 81a to drive the gear lever 81 clockwise.

Consequently, the lever portion 83 of the gear lever 81 pulls the right side plate of the holder 2 inwardly of the recorder through the first coiled spring 20.

Simultaneously with this, the rotation of the gear lever 81 is transmitted to the left gear lever 96 shown in FIG. 3 through the first transmission gear 91 in mesh with the lever 81, the second transmission gear 92, etc. Through the third coiled spring 98, the gear lever 96 pulls the left side plate of the cassette holder 2 inwardly of the apparatus.

Figure 13:
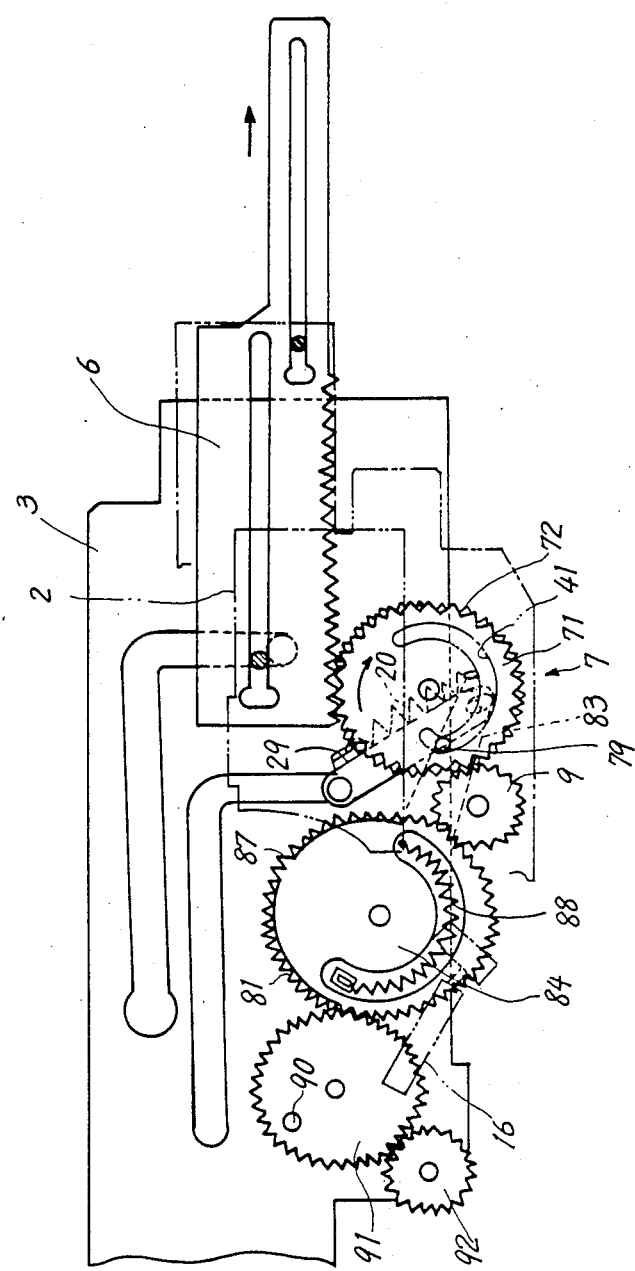

As a result, the two side plates of the holder 2 are pulled at the same time. The holder 2 is therefore moved first horizontally and then vertically downward along the L-shaped slide guide slits 32, 33, 34, 35 and finally brought to the loading completed position at the terminal ends of the slide guide slits when the slide drive plate is almost brought to the end of the path of its rightward movement as seen in FIG. 13. At this position, the cassette 11 on the holder 2 is placed on the pair of reel supports. At this time, the first coiled spring 20 is slightly stretched to bias the holder 2 downward in the loading completed position.

Figure 16:
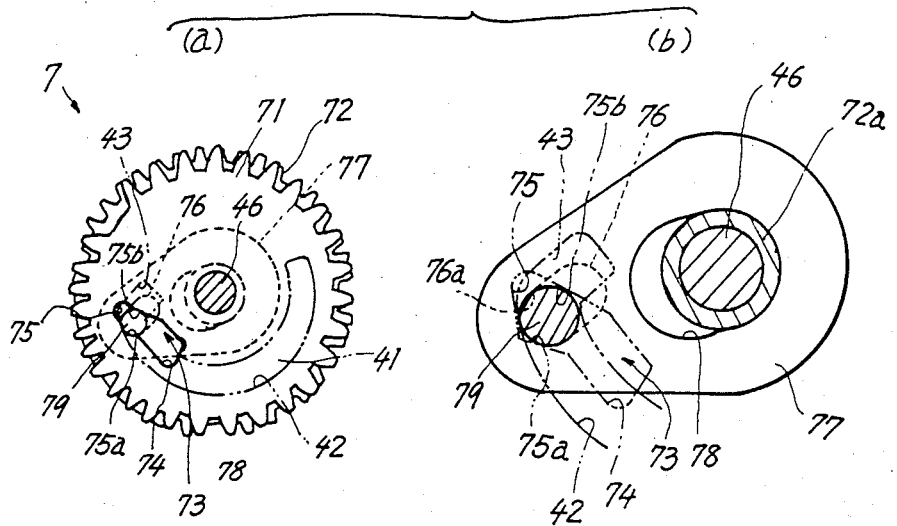

While the slide drive plate 6 moves from the position of FIG. 10 through the positions of FIGS. 11 and 12 to the position of FIG. 13, the drive rotary member 7 shifts from the state shown in FIGS. 15 (a) and (b) to the state shown in FIGS. 16 (a) and (b).

More specifically, the first gear 71, second gear 72 and coupling plate 77 rotate together by about one-half of a turn, and the engaging pin 79 moves along the guide aperture 41 from the starting end of the circumferential aperture portion 42 to the terminal end thereof.

LOCKING OF CASSETTE HOLDER

Figure 14:
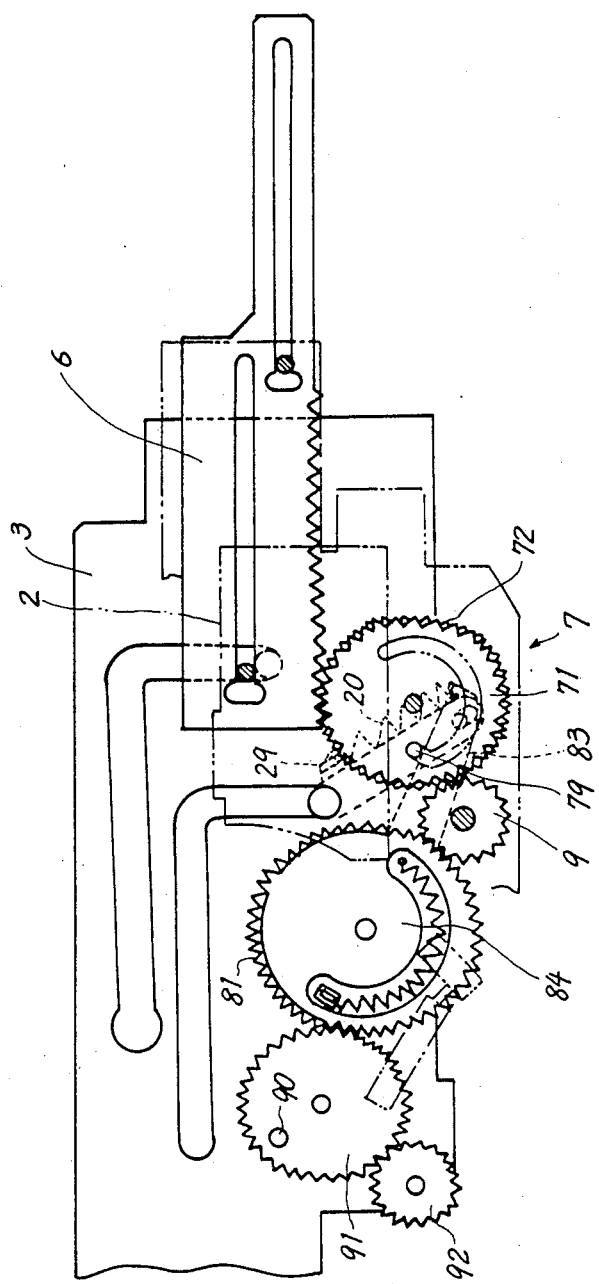

The slide drive plate 6 is thereafter further driven by the loading motor to the position of FIG. 14. With this movement, the first gear 71 of the drive rotary member 7 slightly rotates clockwise.

Figure 17:
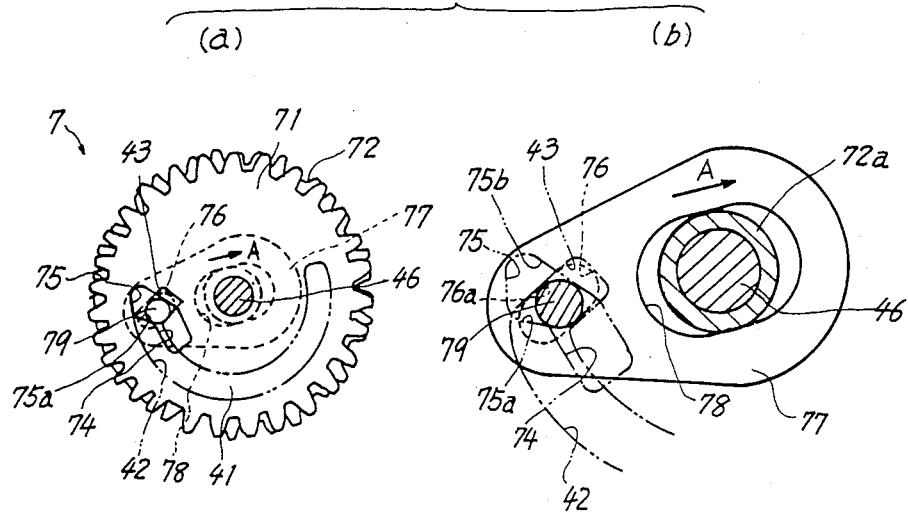

The rotation of the first gear 71 causes the side wall 75a defining the slanting aperture portion 75 to further push the engaging pin 79 into the lock aperture portion 43 of the guide aperture 41 as seen in FIGS. 17 (a) and (b).

Since the lock aperture portion 43 extends in a direction closer to the shaft 46 but off-center thereof, the coupling plate 77 slides in the direction of arrow A while rotating owing to a clearance in the slot 78 around the shaft 46.

The second aperture 76 of the second gear 72 is at this time so positioned and inclined as to lap over the lock aperture portion 43 of the guide aperture 41, so that the engaging pin 79 merely slidingly moves through the second aperture 76 longitudinally thereof without pushing the wall defining the second aperture 76. Consequently, the second gear 72 discontinues rotation.

Figure 18:
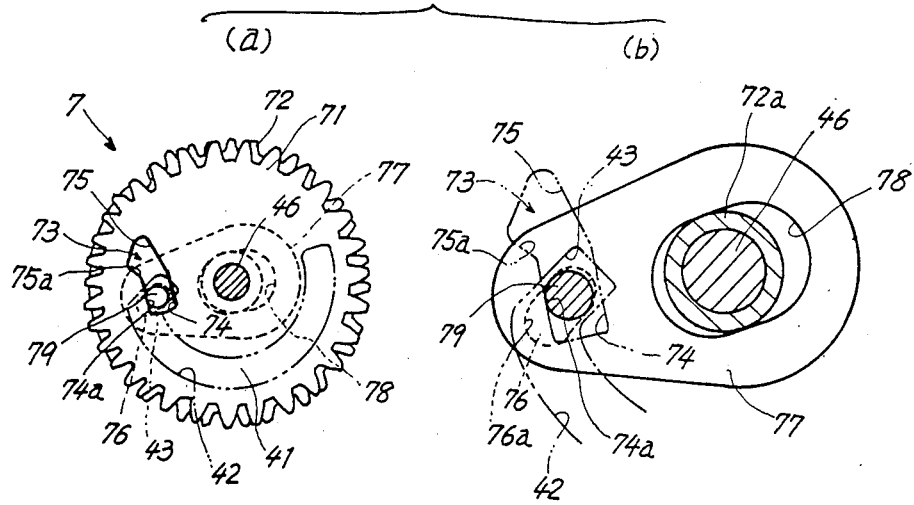
Figure 19:
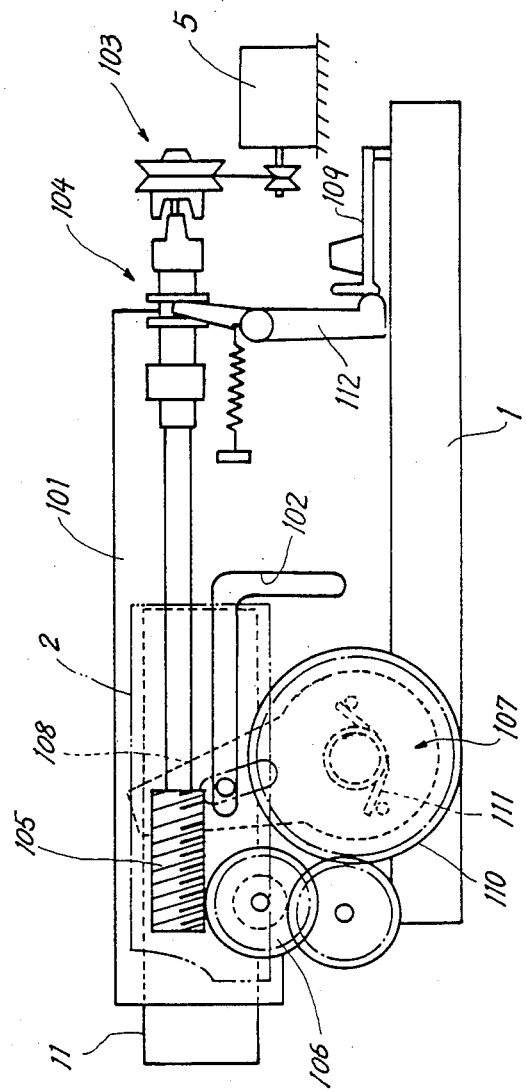
FIG. 19 is a side elevation showing a conventional cassette loading device.

When the first gear 71 is further rotated clockwise by the loading motor, the wall defining the circular-arc aperture portion 74 of the first aperture engages with the engaging pin 79 as shown in FIGS. 18 (a) and (b), with the result that the engaging pin 79 is self-locked with its periphery restrained by the walls defining the portion 74 and the lock aperture portion 43 and is thereby prevented from moving.

Even when the engaging pin 79 is subjected to a force acting to rotate the pin counterclockwise about the shaft 46, the pin 79 pushes the wall defining the lock aperture portion 43 of the guide aperture 41 and merely pushes the outer wall 74a defining the circular-arc aperture portion 74 of the first aperture 73 perpendicular thereto. Since there is no force acting to rotate the first gear 71 or the coupling plate 77, the engaging pin 79 does not move.

Simultaneously when the engaging pin 79 is brought into the self-locked state, the worm wheel 52 is brought out of meshing engagement with the worm 51, with its toothless portion 53 shown in FIG. 4 opposed to the worm 51, whereby power transmission to the cassette holder 2 is thereafter discontinued.

The loading motor 5 further continues its rotation to transmit its power to the tape loading mechanism, pinch roller pressing mechanism, etc. via the pulley assembly 56, intermediate worm 57 and worm wheel 58, etc. Known cam means or the like (not shown) is interposed between the intermediate worm wheel 58 and these mechanisms to discontinue the operation of the mechanisms during cassette loading.

When the cassette is completely loaded as seen in FIG. 14, the cassette 11 within the holder 2 is pressed downward against the pair of reel supports 13, 14 by the pressing plates 27, 27a of the holder 2 shown in FIG. 5 and by the first coiled spring 20 shown in FIG. 1. Accordingly, the repellent force of these biasing means acts to rotate the second gear 72 of the drive rotary member 7 shown in FIG. 18 (a) and (b) counterclockwise.

However, the engaging pin 79 is in the self-locked state as already stated, and even when subjected to a counterclockwise torque by the second gear 72, the engaging pin 79 is restrained by the wall defining the lock aperture portion 43 of the guide aperture 41 and by the outer wall 74a of the circular-arc aperture portion 74 of the first aperture 73. Accordingly, no force occurs which acts to rotate the first gear 71.

Consequently, unless the first gear 71 is forced to rotate counterclockwise by the motor, the engaging pin 79 is self-locked to reliably hold the cassette holder locked in the loading completed position, obviating the likelihood of unlocking even when the holder is subjected, for example, to an external impact.

CASSETTE UNLOADING

When a cassette unloading instruction is given after recording or reproducing signals, the loading motor 5 reversely rotates, operating an unillustrated control lever mechanism, which in turn forcibly drives the worm wheel 52 shown in FIG. 4 slightly counterclockwise. As a result, the worm wheel 52 starts to mesh with the worm 51 again with its toothless portion 53 released from the worm 51 to drive the slide drive plate 6 leftward.

With the movement of the slide drive plate 6, the first gear 71 of FIG. 18 rotates counterclockwise, causing the side wall 75b defining the slanting aperture portion 75 of the first aperture 73 to forcibly move the engaging pin 79 along the lock aperture portion 43 of the guide aperture 41 and along the second aperture 76 of the second gear 72 away from the shaft 46 as seen in FIG. 17.

Consequently, the engaging pin 79 is released from the lock aperture portion 43 out of the self-locked state as shown in FIG. 16.

The subsequent counterclockwise rotation of the first gear 71 causes the side wall 75b of the slanting aperture portion 75 to push the engaging pin 79 counterclockwise along the guide aperture 41, driving the second gear 72 counterclockwise. Thus, the drive rotary member 7 rotates in its entirety, and the drive mechanism coupled to the cassette holder 2 operates in a direction opposite to the loading direction.

As a result, the cassette holder 2 is transported to the cassette insertion waiting position shown in FIG. 9. During this transport, the pin 90 on the first transmission gear 91 turns on the switch 16, whereby the loading motor 5 is deenergized to complete unloading.

PREVENTION OF ERROR IN INSERTING CASSETTE

When pushing in the cassette 11 as placed in the holder 2 as in FIG. 10, the user usually continuously pushes the cassette for a short period even after the start of the loading motor and releases the cassette from his hand after perceiving the start of transport of the holder 2 by the driven rotary member 8 from a reduction in the cassette pushing load.

However, if the user forces the cassette into the recorder and removes his hand from the cassette approximately simultaneously with the start of the loading motor 5, the holder 2 is forcibly moved toward the unloading direction by the restoring force of the second coiled spring 88 before the hook 81a on the gear lever 81 shown in FIG. 7 drives the driven gear 84 after the start of the motor. In such a case, conventional VTRs are so adapted that after the cassette holder is temporarily moved toward the unloading direction, the holder is transported inwardly of the recorder by the operation of the motor. The abrupt change in the direction of movement then involved is likely to displace the cassette within the holder from the normal position, consequently causing trouble to the subsequent cassette loading operation.

With the present embodiment, therefore, the driven gear 84 of the driven rotary member 8 is formed with an auxiliary gear portion 87 positioned between the two toothless portions 86, 86a to ingeniously smoothly effect the change from the cassette insertion to the cassette loading operation by the motor.

When the switch 16 is turned off to start the loading motor as seen in FIG. 10, the driven gear 84 of the driven rotary member 8 starts to rotate clockwise, and the auxiliary gear portion 87 meshes with the first transmission gear 91 immediately thereafter as shown in FIG. 11. During the subsequent period before the auxiliary gear 87 is brought out of mesh with the first transmission gear 91 as seen in FIG. 12, the driven gear 84 of the driven rotary member 8 and the gear lever 81 are simultaneously in mesh with the first transmission gear 91 and are coupled to each other by the gear 91.

When the cassette is released from the hand simultaneously with the start of the motor, the gear lever 81 slightly rotates counterclockwise by being biased by the second coiled spring 88 during a very short period of time before the auxiliary gear portion 87 comes into mesh with the first transmission gear 91, whereas the auxiliary gear portion 87 meshes with the first transmission gear 91 immediately thereafter, thereby eliminating the likelihood of the holder 2 being repellently forced toward the unloading direction. The rotational angular displacement of the driven gear 84 and the gear lever 81 relative to each other due to the insertion of the cassette is partly absorbed by this process.

After the auxiliary gear portion 87 meshes with the first transmission gear 91, the driven gear 84 and the gear lever 81 rotate together clockwise, with the gear lever 81 prevented from being rotated counterclockwise by the restoring force of the second coiled spring 88.

Subsequently, the moment when the auxiliary gear portion 87 is released from the first transmission gear 91 as seen in FIG. 12, the driven gear 84 and the gear lever 81 are freed from restraint by each other, causing the second coiled spring 88 to instantaneously rotate the gear lever 81 counterclockwise to absorb the remainder of the angular displacement between the driven gear 84 and the gear lever 81. Because the amount of rotation of the gear lever 81 is very small and further because the force of the second coiled spring 88 is once withstood by the meshing of the auxiliary gear portion 87 with the first transmission gear 91 as stated above, the slight rotation will not repellently move the holder 2 toward the unloading direction with a great force.

Accordingly, even if the cassette inserted is released from the hand earlier than usually, the cassette will not be displaced from the proper position.

With the cassette loading device described above, the cassette holder 2 can be reliably held locked in position even after the worm wheel 52 of FIG. 4 is brought out of meshing engagement with the worm 51 shown to insure normal signal recording or reproduction.

Moreover, the cassette can be loaded properly at all times regardless of the force and timing with which the cassette inserted in the holder is pushed in.

The device of the present invention is not limited to the foregoing embodiment in construction but can of course be modified variously by one skilled in the art without departing from the scope of the invention as defined in the appended claims.

For example, the cassette in the holder can be prevented from movement by increasing the pressure to be exerted downward on the cassette by the pressing plates 27, 27a shown in FIG. 5, so that the mechanism for preventing an error in inserting the cassette by the auxiliary gear portion 87 on the driven rotary member 8 need not always be included in the present device.

While the cassette holder lock mechanism provided on the drive rotary member 7 is useful for VTRs wherein a single motor is used for cassette loading and for other operation such as tape loading, the lock mechanism is usable also for other VTRs or the like wherein the cassette loading device is equipped with a loading motor specific thereto, whereby the cassette holder can be locked reliably.

What is claimed is:

1. A cassette loading device provided in a recording-reproduction apparatus for recording signals on a tape in a cassette or reproducing signals from the tape, the device being adapted to transport the cassette inserted into a cassette inlet to a recording-reproduction position, the cassette loading device being characterized in that the device comprises a cassette holder for holding the cassette as accommodated therein, a holder reciprocation guide mechanism provided along a path of travel of the holder formed on a chassis and extending from a cassette insertion waiting position to a loading completed position, a motor mounted on the chassis, and a power transmission system for transmitting power from the motor to the cassette holder, the power transmission system having incorporated therein a holder lock mechanism for locking the cassette holder in the loading completed position, the holder lock mechanism comprising a first rotary member rotatably driveable by said motor, a second rotary member for transmitting rotatable drive of said first rotary member to said cassette holder, a coupling member simultaneously engageable with said two rotary members for connecting said two rotary members to each other, and restricting means provided on said chassis and in engagement with said coupling member for restricting the movement of said coupling member, said restricting means having a first restricting portion for restricting movement of said coupling member from the start of cassette loading until said cassette is almost completely loaded causing said coupling member to connect said rotary members together for simultaneous rotation, and a second restricting portion for restricting the position of said coupling member when said cassette is completely loaded for preventing said second rotary member from rotating in a cassette unloading direction.

2. A cassette loading mechanism as defined in claim 1 wherein said first and second rotary members are rotatably fitted around a shaft provided upright on a support plate on said chassis, and said coupling member is formed in its base end with a slot having a shaft fitted therein and provided at its forward end with an engaging pin on a line extending from said slot, said engaging pin being in engagement with a receiving portion formed in each of said rotary members and said support plate, said receiving portion of said support plate including a circumferential apertured portion serving as said first restricting portion and extending along a circumference centered about said shaft, and a lock apertured portion serving as said second restricting portion and extending from one end of said circumferential apertured portion toward or away from said shaft in a bent form, said engaging pin having its periphery surrounded by said lock apertured portion and said receiving portion of said first rotary member when the cassette is completely loaded, whereby said engaging pin and said second rotary member are prevented from movement or rotation.

3. A cassette loading device as defined in claim 2 wherein said receiving portion of said first rotary member has a circular-arc aperture extending along a circular arc centered about said shaft and a slanting aperture extending from one end of said circular-arc aperture toward or away from said shaft, and said receiving portion of said second rotary member is slot shaped and inclined to lap over said lock apertured portion of said support plate when the cassette is completely loaded, said engaging pin being movable along said circumferential apertured portion while being restrained by a wall defining said slanting aperture of said first rotary member and a wall defining said slot of said second rotary member from the start of loading until the cassette is almost completely loaded, said engaging pin having its periphery surrounded by walls defining said lock apertured portion, said circular-arc aperture of said first rotary member and said slot of said second rotary member when the cassette is completely loaded so that the torque acting on said second rotary member in the unloading direction is withstood by said walls defining said lock apertured portion and said circular-arc aperture through said engaging pin.

4. A cassette loading device provided in a recording-reproduction apparatus for recording signals on a tape in a cassette or reproducing signals from said tape, said device transporting a cassette inserted into a cassette inlet in a chassis to a recording-reproduction position in said chassis, said cassette loading device comprising a cassette holder in said chassis for holding a cassette positioned in said holder, a holder reciprocation guide mechanism positioned along a path of travel of said holder in said chassis and extending from a cassette insertion waiting position to a loading completion position, a motor mounted on said chassis, and a power transmission system for transmitting power from said motor to said cassette holder, said power transmission system having an intermittent rotation mechanism operative for power transmission during cassette loading but inoperative for power transmission after said cassette has been completely loaded and a holder lock mechanism between said intermittent rotation mechanism and said cassette holder for receiving the power from said motor immediately before said cassette is completely loaded for locking said cassette holder in said completely loaded position, said holder lock mechanism comprises a first rotary member rotatably driven by said motor, a second rotary member for transmitting said motor drive from said first rotary member to said cassette holder, a coupling member simultaneously engageable with said rotary members for connecting said rotary members together, and restricting means on said chassis and in engagement with said coupling member for restricting the movement of said coupling member, said restricting means having a first restricting portion for restricting the movement of said coupling member from a start of cassette loading until said cassette is almost completely loaded for causing said coupling member to connect said rotary members for rotation together, and a second restricting portion for restricting the position of said coupling member when said cassette is completely loaded and causing said coupling member to prevent said second rotary member from rotating in an unloading direction.

5. A cassette loading device provided in a recording-reproduction apparatus for recording signals on a tape in a cassette or reproducing signals from said tape, said device transporting a cassette inserted into a cassette inlet to a recording-reproduction position, said cassette loading device comprising a cassette holder for holding a cassette accommodated therein, a holder reciprocation guide mechanism positioned along a path of travel of said holder formed on a chassis and extending from a cassette insertion waiting position to a load completed position, a motor automatically initiated into operation upon the pushing of a cassette into said cassette holder in a cassette waiting position, a power transmission system for transmitting driving power from said motor to said cassette holder, and a control mechanism coupled to said power transmission system for restricting the movement of said cassette holder when cassette loading is started, said power transmission system comprising a first rotary drive member coupled to said motor, a second rotary drive member coupled to said cassette holder and engageable with said first rotary drive member for rotation relative thereto over a predetermined angular range, and a spring extending between said rotary drive members for biasing said cassette holder in an unloading direction, said control mechanism being operable by said driving power received from said motor for a specified period of time immediately after the start of said motor for coupling said first and second rotary drive members to each other for rotation and for preventing said cassette holder from moving in an unloading direction.

6. A casette loading device as defined in claim 5 wherein said control mechanism comprises a first gear portion formed on said first rotary drive member, a second gear portion formed on said second rotary drive member, and a control gear meshing with said second gear portion at all times and meshing with said first gear portion only for the specified period of time immediately after the start of said motor.

* * * * *